United States Patent [19]

Hough, Jr.

[11] Patent Number: 4,623,102

[45] Date of Patent: Nov. 18, 1986

[54] ARTICLE CLAMP

[75] Inventor: William C. Hough, Jr., St. James, N.Y.

[73] Assignee: Apple Adhesives, Inc., Hollis, N.Y.

[21] Appl. No.: 561,194

[22] Filed: Dec. 14, 1983

[51] Int. Cl.$^4$ .............................................. F16L 3/22
[52] U.S. Cl. .................................. 248/68.1; 24/543; 248/74.3
[58] Field of Search ............... 248/74.1, 74.3, 74.4, 248/74.5, 74.8, 69, 68.1; 24/543

[56] References Cited

U.S. PATENT DOCUMENTS

| 3,049,585 | 8/1962 | Cochran | 174/164 |
|---|---|---|---|
| 3,074,675 | 1/1963 | Brown | 248/68 |
| 3,090,826 | 5/1963 | Cochran | 174/158 |
| 3,423,055 | 1/1969 | Fisher | 248/73 |
| 3,429,985 | 2/1969 | Czigler | 174/164 |
| 3,463,427 | 8/1969 | Fisher | 248/68 |
| 3,471,109 | 10/1969 | Meyer | 248/68 |
| 3,529,795 | 9/1970 | Van Niel | 248/71 |
| 3,565,376 | 2/1971 | Vlers | 248/68 |
| 3,637,177 | 1/1972 | Santucci | 248/74.5 |
| 3,659,319 | 5/1972 | Erickson | 248/74 |
| 3,766,925 | 10/1973 | Rubricius | 128/346 |
| 3,809,371 | 5/1974 | Martini | 256/47 |
| 3,874,042 | 4/1975 | Eddleman et al. | 24/255 |
| 3,906,592 | 9/1975 | Sakasegawa et al. | 24/73 |
| 3,913,187 | 10/1975 | Okuda | 24/255 |
| 3,991,960 | 11/1976 | Tasaka | 248/68 |
| 4,193,174 | 3/1980 | Stephens | 24/249 |
| 4,212,303 | 7/1980 | Nolan | 128/346 |
| 4,220,301 | 9/1980 | Jacobs et al. | 248/74 |
| 4,240,604 | 12/1980 | Brach | |
| 4,247,076 | 1/1981 | Larkin | 251/7 |
| 4,317,262 | 3/1982 | Wells, Jr. | 24/16 |
| 4,390,019 | 6/1983 | LeVeen et al. | 128/325 |
| 4,457,482 | 7/1984 | Kitagawa | 248/74.3 |

FOREIGN PATENT DOCUMENTS

| 1022820 | 3/1966 | Fed. Rep. of Germany . | |
| 2442414 | 3/1976 | Fed. Rep. of Germany | 248/74.5 |
| 0047864 | 3/1982 | Fed. Rep. of Germany . | |
| 310777 | 12/1969 | Sweden | 248/74.7 |

OTHER PUBLICATIONS

Dura-Clamp Flow Valves for Flexible Tubing—Thermoplastic Scientifics, Inc.,—copyrighted 1979.

Primary Examiner—J. Franklin Foss
Assistant Examiner—David L. Talbott
Attorney, Agent, or Firm—Kane, Dalsimer, Kane, Sullivan and Kurucz

[57] ABSTRACT

The present invention provides for a cable clamp for releasably securement of either round or flat articles, wherein the clamp is made having an integral plastic body with a base, a hinge upstanding from one end of the base, a rigid beam cantilever-supported by the hinge and a latching member upstanding from an opposite end of the base and formed so as to facilitate selective engagement with the beam.

7 Claims, 6 Drawing Figures

ARTICLE CLAMP

FIELD OF THE INVENTION

This invention relates generally to apparatus for disposition of electrical cables and pertains more particularly to clamps for retentively engaging cables.

BACKGROUND OF THE INVENTION

In various installations of electrical wiring, need arises for clamps and the like to dress cables into and in prescribed locations. Various known clamps incorporate relatively movable components which are openable for receipt of a cable and then adapted, by self-resiliency or appropriate latching structure, to tightly circumscribe the cable and maintain same in the desired position or location.

Presently known clamps are typically dedicated for use with a given cable configuration, i.e., on individual cable of circular cross-section or a cable bundle of circular rectangular cross-section, on the other hand. To date, the art has not evolved a simple and efficient clamp having capability for clamping either type of cable at the user's option.

SUMMARY OF THE INVENTION

The present invention has as its primary object the provision of efficient yet relatively simple and inexpensive apparatus for clamping cables or other elongate articles of diverse cross-section.

In attaining the foregoing and other objects, the invention provides a cable clamp for releasably securement of either round or flat articles, the clamp comprising an integral plastic body having a base, a hinge upstanding from one end of the base, a rigid beam cantilever-supported by the hinge and a latching member upstanding from an opposite end of the base and formed so as to facilitate selective engagement with the beam.

In the preferred embodiment, the base defines a flat interior surface portion and the beam has first and second flat interior surface portions, respectively continuous with the hinge and in facing relation to the base flat interior surface portion. The hinge defines an arcuate interior surface. Upon deflection of the beam member towards the base, after insertion of a round cable in the hinge or insertion of a flat cable upon the base flat interior surface portion, the hinge is compressed upon the round cable, and the beam surface adjacent the hinge forcibly engages the cable or the beam and base flat interior facing surface portions compressingly engage the flat cable. In either case, the beam is retained in its cable-engaging relation by engagement of the beam by the latching member, which is itself deflectable to release the beam and return the hinge to its relaxed state.

In the relaxed state of the hinge, wherein the beam is not engaged with the latching member, the beam second flat interior surface portion is disposed at an acute angle relative to the base flat interior surface portion, such that deflection of the beam into retentive engagement with the latching member gives rise to parallelism as between the beam second flat interior surface portion and the base flat interior surface portion.

Once the desired clamping is achieved, or even before, the clamp may be affixed to a surface by way of perhaps an adhesive backing.

BRIEF DESCRIPTION OF THE DRAWINGS

These and other objects and advantages will be realized by the present invention, the description of which should be taken in conjunction with the drawings, wherein.

DETAILED DESCRIPTION OF THE PREFERRED EMBODIMENT

Figure 1:
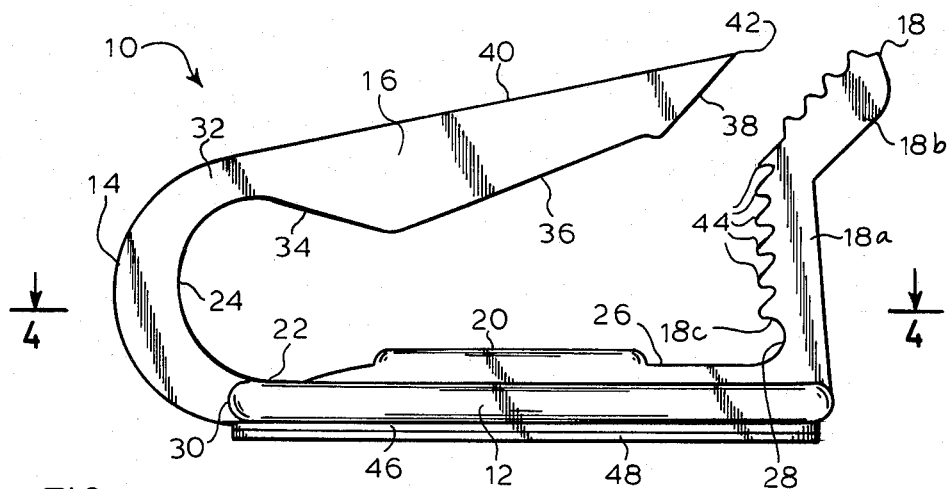
FIG. 1 is a front elevation of a clamp in accordance with the present invention.
Figure 2:
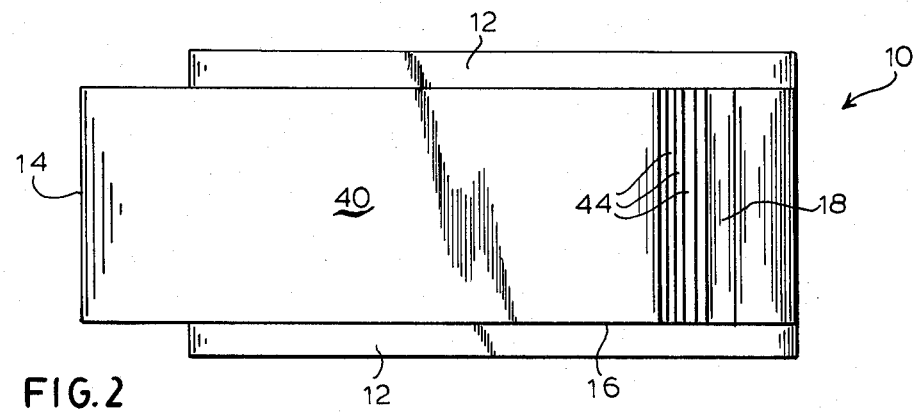
FIG. 2 is a top plan view of the FIG. 1 clamp.
Figure 3:
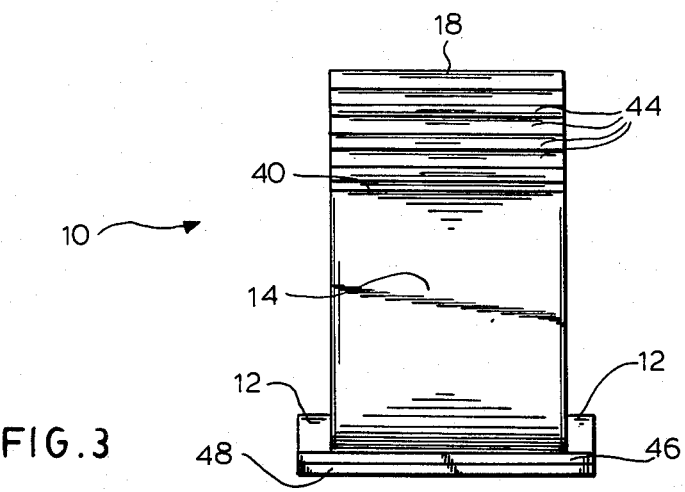
FIG. 3 is a left side elevation of the FIG. 1 clamp.
Figure 4:
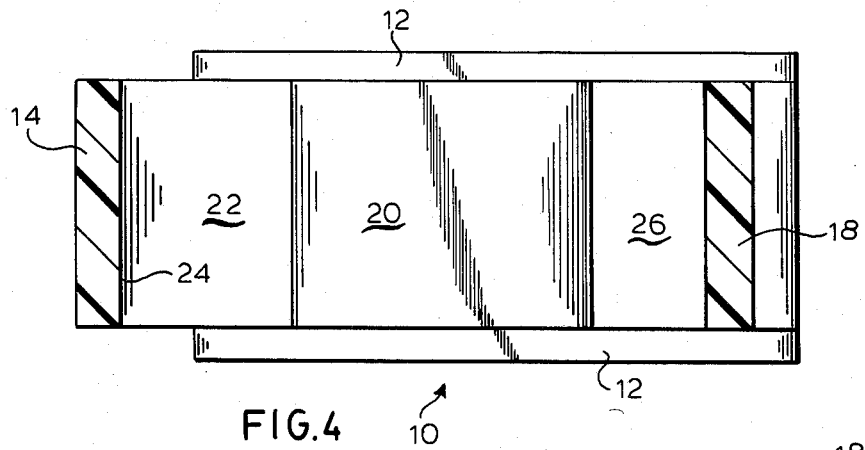
FIG. 4 is a sectional view of the FIG. 1 clamp as would be seen from plane V—V of FIG. 1.

With reference now to FIGS. 1–4, clamp 10 is an integrally formed plastic body having an elongate base 12, a hinge 14 upstanding from one longitudinal end of base 12, a rigid beam member 16 supported in cantilever fashion by hinge 14 and a latching member 18 upstanding from base 12 opposite hinge 14.

Base 12 has its interior surface configured in first elevated flat portion 20, in leftward arcuate portion 22 continuous with arcuate interior surface 24 of hinge 14, and in rightwardly extending surface portion 26 continuous with necked down portion 28 of latching member 18. Hinge 14 is a bendable spring hinge which is supported for pivotal movement about base end 30.

Figure 5:
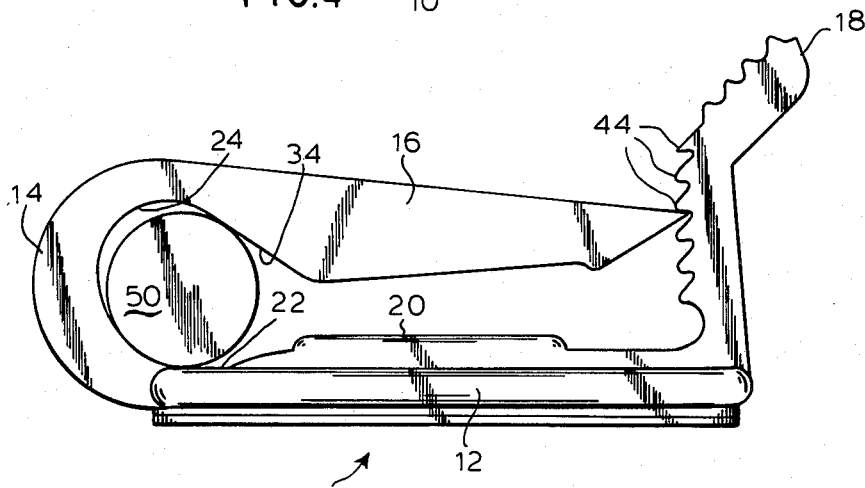
FIG. 5 is a front elevation of the FIG. 1 clamp in an operative retaining relation with a cable having circular cross-section.

Hinge 14 may be viewed to extend from base end 30 to portion 32 with an internal surface 24 which has a configuration of a half-circle. For retention of circular cross-section cable for example, beam 16 has first flat interior surface portion 34 continuous with arcuate surface 24 which with base arcuate surface 22 collectively provides for such cable retention as shown in FIG. 5.

Beam 16 has a second flat interior surface portion 36 forming an obtuse angle with beam surface 34 and extending therefrom to beam end chamfer 38. End chamfer 38 and beam exterior surface 40 intersect at line surface 42.

Latching member 18 has its lower part 18a inclined clockwise toward base 12 in FIG. 1 and forming an acute angle therewith and its upper part 18b inclined counterclockwise of base 12. Ribs 44 are somewhat triangular and project from surface 18c of member 18. The upper ribs on part 18b facilitating operator movement of the member 18 and point almost perpendicular to surface 18c. The lower ribs on part 18a serving as detents for latching line surface 42 of beam 16 and as such project slightly downward from surface 18c on portion 18a.

Base 12 may have an adhesive layer 46 applied thereto with peel-away protective film 48 on the undersurface of layer 46 to facilitate mounting of the clamp to a harness board or the like.

Clamp 10 is shown in its relaxed state in FIG. 1, i.e., wherein beam 16 and latching member 18 are not retentively engaged and hinge 14 is in an unbent form. Member 18 is in self-biased upstanding disposition. In this state, the clamp may be opened for insertion of a cable by lifting beam 16 upwardly against the self bias of hinge 14. Following insertion of the cable, the clamp parts return to the FIG. 1 relaxed state.

Considering latching member 18 in further detail, its lower ribs 44 on part 18a have their apices in locations which are successively vertically spaced from base 12 and which are successively longitudinally spaced relative to base 12. Concomitant to such spacing is the motion imparted to beam 16 in the course of operator input thereto to entrap a cable resident in clamp 10. This motion, as a direct result of operator downward force on beam 16, has one component causing line surface 42 to move into engagement with the rib 44 immediately therebelow and thereby to displace latching member 18 rightwardly from its FIG. 1 disposition until surface 42 rides beyond such engaged rib and seats retentively therebelow, member 18 returning under self-bias from its momentary rightward displacement. The downward angle of the upper surface of the ribs 44 serve to facilitate the downward movement of beam 16 engaging therewith. A second beam motion component is occasioned by compression and pivotal movement of hinge 14 which results in a slight translational displacement of beam 16 rightwardly from its FIG. 1 disposition, to thereby slightly displace line surface 42 toward latching member 18 into entrapped relation to the rib 44 thereof thus traversed.

The entrapment of a circular cross-section cable 50 by this practice is shown in FIG. 5. Here, line surface 42 has traversed three of ribs 44 from its FIG. 1 disposition and line surface 42 is entrapped by the last-traversed rib. Surface portion 34 of beam 16 bears forcibly against cable 50, which is otherwise engaged by arcuate surface 24 of hinge 14 and arcuate surface 22 of base 12 pinching it therebetween the degree of which depends upon how far beam 16 is depressed. To release cable 50, latching member 18 is pushed rightwardly to release beam 16.

Figure 6:
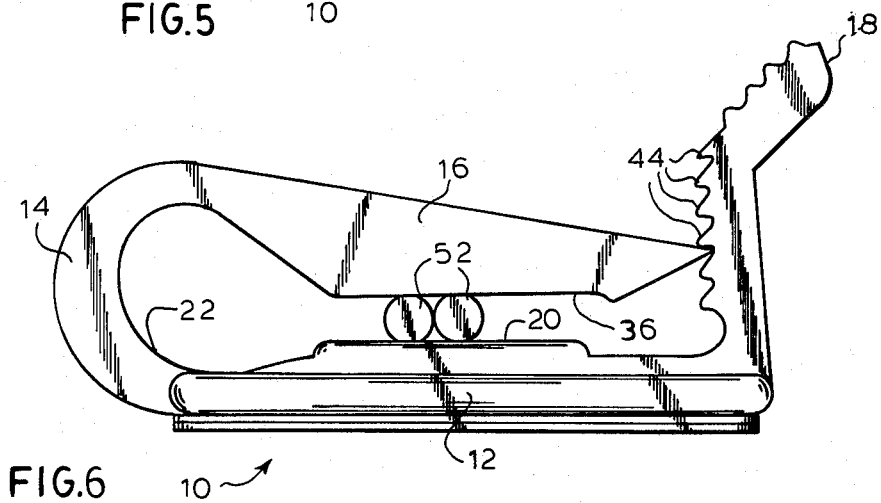
FIG. 6 is a front elevation of the FIG. 1 clamp in an operative retaining relation with a cable having rectangular cross-section.

In FIG. 6, two-conductor cables 52, such as generally flat household wiring, is entrapped in clamp 10. Here, surface portion 36 is displaced from its acute angle orientation with respect to base surface 20 in the clamp relaxed FIG. 1 state and in lesser acute angle relation in the constrained state of FIG. 5, into substantial parallelism with the base surface 20. Such parallel disposition of surfaces 36 and 20 conforms substantially the same to the surfaces of cable 52 with which they are in forcible engagement. Note further that the height of base surface 20 can be changed, depending on its application, to vary the distance between it and portion 36. This is particularly advantageous, since the clamp 10 can be easily modified for clamping different size cables therebetween.

Various changes to configuration of structure and modifications in practice from the foregoing can be introduced without departing from the invention. Accordingly, while a preferred embodiment is disclosed and described in detail herein, its scope should not be limited thereby, however, its scope should be determined by that of the appended claims.

What is claimed is:

1. A releasable retainer adapted for retaining a first wire having a first diameter or several second wires having a second diameter smaller than said first diameter, said retainer comprising: an integral plastic body defining an elongate base extending between first and second ends of said base along a longitudinal axis and having a generally flat interior base surface, a hinge upstanding from said base first end and cantilever-supported by said base, said hinge having an arcuate interior surface engageable with said first wire along an axis perpendicular to the longitudinal axis, an rigid beam catilever-supported by said hinge at one end with a free end opposite thereto and including a first flat interior surface portion continuous with said hinge interior surface for engagement with said first wire so as to clamp said first article between said first flat interior surface and said arcuate surface of the hinge upon movement of the beam towards the body, said beam further including a second interior surface which cooperates with said base surface to engage said several second wires along said axis perpendicular to the longitudinal axis when said second interior and said base surfaces are parallel, and means releasably retaining said free end of the beam at a predetermined plurality of poisitons so as to allow for adjustably retaining the free end therein.

2. The retainer in accordance with claim 1 which further includes a first elevated platform positioned on the base with the degree of said platform elevation from the base determining the distance between said platform and said second portion whereby a change in the height of said platform changes the point at which clamping a cable therebetween occurs.

3. The retainer in accordance with claim 1 wherein said releasing means comprises a latching member cantilever-supported by said base second end and a plurality of successive detents along a first portion of said latching member for selectively retentively engagement with the free end of said beam.

4. The retainer in accordance with claim 3 wherein said latching member includes a second portion positioned at an angle to the first portion so as to facilitate movement of the latching member so as to disengage the free end of the beam therefrom.

5. The retainer in accordance with claim 4 wherein said first portion of the latching member is biased toward engagement with the free end of the beam and said detents are successively vertically and longitudinally spaced relative to the base, and at least one of said detents providing for parallelism of said base and said beams second flat interior surface when said free end is in engagement therewith.

6. The retainer in accordance with claim 5 wherein said detents on the first portion are formed from adjacent ribs, said ribs have apices which extend downwardly towards the base and said second portion includes ribs which facilitate grasping.

7. The retainer in accordance with claim 5 wherein said base includes a generally flat exterior surface on which is positioned an adhesive means for affixing the retainer to a surface.

* * * * *

UNITED STATES PATENT OFFICE
CERTIFICATE OF CORRECTION

PATENT NO. : 4,623,102

DATED : November 18, 1986

INVENTOR(S) : William C. Hough, Jr.

It is certified that error appears in the above-identified patent and that said Letters Patent is hereby corrected as shown below:

On title page, item [73]
 delete "Apple" and substitute therefor --Applinter--

Signed and Sealed this

Twenty-second Day of March, 1994

Attest:

BRUCE LEHMAN

Attesting Officer     Commissioner of Patents and Trademarks